July 31, 1945. E. G. CROOKS 2,380,724
WOOD SCREW
Filed Jan. 12, 1944
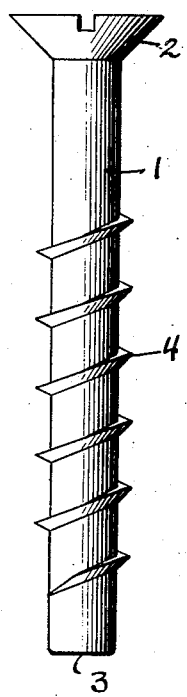
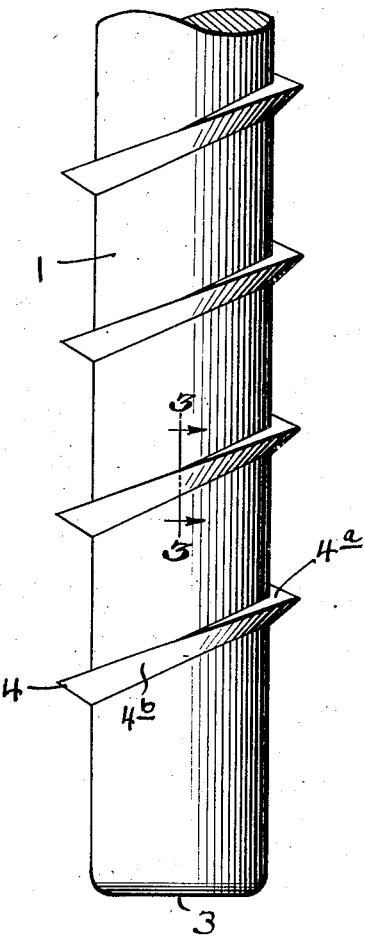
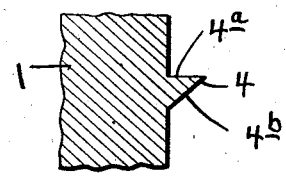
Inventor
Earl G. Crooks
By Dowell & Dowell
Attorneys Patented July 31, 1945

2,380,724

UNITED STATES PATENT OFFICE 2,380,724

WOOD SCREW

Earl G. Crooks, Binghamton, N. Y., assignor to Lestershire Spool and Manufacturing Company, Johnson City, N. Y., a corporation of New York Application January 12, 1944, Serial No. 517,994

1 Claim. (Cl. 85—46)

This invention is a novel improvement in wood screws having non-splitting and maximum holding qualities when screwed crosswise or lengthwise of the grain of the wood; and the principal object thereof is to provide a wood screw having a head, a cylindrical shank of constant uniform diameter, and a knife-like thread on the shank of relatively steep pitch extending from a point below the head and terminating at a point above the outer tip of the shank, said screw being adapted to be screwed into a preformed bore of substantially the same diameter as the shank. Various manufacturers have heretofore provided wood screws which hold approximately three times or more as well when screwed crosswise of the grain as when screwed lengthwise the grain, but I have provided a screw which tests have shown holds better than three times the holding force of any screw of comparable size when screwed lengthwise of the grain as ordinary screws do when screwed crosswise of the grain.

Another object of the invention is to provide a wood screw having a uniform straight shank from the head of the screw down through the thread root to the tip, said screw having a thread design thereon permitting the use of a lesser number of threads per inch than normal without increasing the inserting torque beyond the strength of screw body. The lesser number of threads per inch is a great factor in the holding power, inasmuch as the fibre of the wood adjacent the shank is cut or broken at fewer points, thus leaving intact almost the full strength of the wood fibre. The fewer the points at which the fibre is broken, the stronger the holding force of the wood will be providing the thread holding area is maintained. However, by decreasing the threads per inch, the thread holding area is likewise decreased. By experiments I have found that five to eight threads per inch gives the maximum holding force coupled with simplicity of manufacture of the screw. A five to eight thread pitch has a greater area of thread holding force than a four thread pitch or lower, although in the lower thread pitch the wood holding force increases slightly; but the increase in thread area more than offsets the increase in wood-holding ability.

A further object of the invention is to provide a wood screw of the above type which although especially designed for use lengthwise of the grain of the wood, is equally advantageous in plastics, fibre or similar materials, or for use crosswise of the grain of the wood; and moreover my screw may be used for fastening "Bakelite", fibre or metal heads to wooden or plastic barrels.

A still further object of the invention is to provide a wood screw having a cylindrical shank having threads of steep pitch in which the top faces of the threads are disposed at right angles to the shank and in which outside diameter of the thread is uniform throughout, said type of thread giving two distinct non-splitting advantages; first, the knife-like thread of constant outside diameter and with a straight top face has less tendency to split the wood when inserted endwise of the grain than any other type when setting the screw; and secondly, when the screw has once been set this shape of thread has much less tendency to split out end grain wood when force is exerted to pull out the screw. When a hole of same diameter as the shank is preformed in the wood, and when a screw having a cylindrical shank and having a thread as described above is formed on said straight shank is applied thereto, the combination of the two features gives a screw having the least possible splitting tendency either when being screwed in or forced out of the hole. These two features, taken in conjunction with the steep pitch of the thread formed with as wide as possible interstices between the threads, the thread being of the maximum diameter possible to roll to give a thin or knife-like edge, provide a non-splitting screw having a maximum strength for shank diameter.

A still further object is to provide a screw having a uniform cylindrical shank extending both above, through, and below the threaded portion, the part below the thread serving as a lead for the screw, and having a very important function in the non-splitting characteristics of the screw. Were this lead to follow purely a previously drilled hole, the threaded portion when entering the preformed hole would tend to push the screw off to one side or the other, ordinary pointed screws frequently splitting the wood when the hole is bored lengthwise of the grain. The straight shank of my screw both above and below the threaded portion, and beneath the threaded portion, is the only shape which will practically eliminate any tendency to split the wood when used in conjunction with a knife-like thread as above described.

Other minor objects of the invention will be hereinafter set forth.

I will explain the invention with reference to the accompanying drawing, which illustrates one practical embodiment thereof to enable others familiar with the art to adopt and use the same; and will summarize in the claim the novel features of construction, and novel combinations of parts, for which protection is desired.

In said drawing:

Fig. 1 is an elevation of my novel screw.

Fig. 2 is an enlarged elevation of the lower portion of the screw, showing the threads thereon.

Fig. 3 is a section on the line 3—3, Fig. 2.

As shown in Fig. 1, the screw preferably comprises a cylindrical shank 1, of uniform diameter, extending from the head 2 to the blunt tip 3, and of diameter to develop the maximum holding qualities when screwed endwise or crosswise of the grain of the wood. Head 2 may be of any desired design. The screw is designed for use with a preformed bore of substantially the same diameter as shank 1, the part below the threads 4 of the screw serving as a lead which is an important feature with respect to non-splitting characteristics.

Upon shank 1, between head 2 and the blunt tip 3, is formed a knife-like thread shown in Figs. 2 and 3, the thread 4 having the same constant outside diameter and having its top face 4a (Fig. 3) disposed normal to the axis of shank 1, and its lower face 4b inclined thereto, said form of thread having the flat top face 4a being designed to take the load normal to the bore rather than inclined outwardly thereto as is the case with ordinary screw threads. Said type of thread 4 has less tendency to split when inserted endwise of the grain than other design when seating the screw. Likewise, when the screw has once been set, the type of thread has much less tendency to split out end grain wood when force is exterted to pull out the screw. My novel screw, having a uniform cylindrical or straight shank from the head down through the thread root and below to the tip, and having the knife-like thread 4, gives two distinct non-splitting advantages; first, the knife-like thread with the straight top face 4a has less tendency to split the grain wood than any other design when seating the screw; and secondly, when the screw has been once set this type of thread 4 has much less tendency to split end grain wood when force is exerted to pull out the screw.

The pitch of the thread 4 is preferably from approximately four to eight threads per inch, for the reason that the lesser number of threads per inch is a great factor in holding power inasmuch as fewer points in the wood fibre are broken by the threads, thus providing a stronger holding force of the wood by leaving intact almost the full strength of the wood fibre, provided the requisite thread-holding area is maintained. However, in decreasing the threads per inch, the thread-holding area is likewise decreased. Experiments have shown that four to eight threads per inch gives requisite holding force. A five pitch thread has a greater area of thread-holding force than a four pitch or lower, although the wood-holding force increases slightly; but the increase in thread area more than offsets the increase in wood-holding ability. Since the higher thread is somewhat easier to manufacture I may use an eight pitch which gives practically the maximum holding force coupled with simplicity of manufacture of this type of screw.

When a hole of same diameter as shank 1 is bored in the wood, and my novel screw having a knife-like thread 4 formed on the straight shank 1 is inserted therein, the combination of these two features gives a screw with least possible splitting tendency either when forced in or out. The combination of these two features thus forms a non-splitting screw which, taken in conjunction with the steep thread pitch, with as wide as possible interstices between the threads, the thread having the maximum diameter thread possible to roll with a thin or knife-like edge, gives maximum strength for shank diameter.

The cylindrical part of shank 1 below the thread 4 serves as a lead for the threaded portion, and is an important non-splitting feature. Were this lead to follow a previously drilled hole the threaded portion when entering the preformed hole would tend to push off to one side or the other and in ordinary screws frequently acts to split the wood when screwed with the grain. The uniform straight shank both above and below the threaded portion 4 and beneath the threaded portion, practically eliminates any tendency to split when used in conjunction with the knife-like thread.

While my screw is especially designed for insertion endwise of the grain of wood, it is equally advantageous in securing plastics, fibrous or similar material, or for insertion cross-grain of the wood; also the screw may be used for fastening Bakelite or fibre heads to wooden, plastic or metal barrels.

I claim:

A wool screw comprising a straight cylindrical shank of uniform diameter; a head at one end thereof; and sharp faced knife-like threads of greater height than base on said shank spaced from the head and outer tip of the shank; said thread having its upper face disposed normal to the axis of the shank, and having its lower face inclined thereto; and said thread having a uniform outside diameter throughout its length; said threads having a steep pitch of approximately four to eight threads per inch; and the cylindrical portion of the shank below the threads forming a lead for the threaded portion when entering a pre-drilled hole of substantially the same diameter as the shank.

EARL G. CROOKS.